United States Patent
Guo et al.

(10) Patent No.: US 8,788,664 B2
(45) Date of Patent: *Jul. 22, 2014

(54) MAPPING NETWORK ADDRESSES TO GEOGRAPHICAL LOCATIONS

(71) Applicant: Microsoft Corporation, Redmond, WA (US)

(72) Inventors: Chuanxiong Guo, Nanjing (CN); Jiahe Helen Wang, Issaquah, WA (US); Qing Yu, Beijing (CN); Yongguang Zhang, Beijing (CN); Youjun Liu, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,216

(22) Filed: Jan. 28, 2013

(65) Prior Publication Data

US 2013/0145043 A1  Jun. 6, 2013

Related U.S. Application Data

(63) Continuation of application No. 11/871,810, filed on Oct. 12, 2007, now Pat. No. 8,364,816.

(51) Int. Cl.
*G06F 15/16* (2006.01)

(52) U.S. Cl.
USPC .......................................... 709/225; 709/228

(58) Field of Classification Search
USPC ............................ 709/200, 225, 228; 370/229
See application file for complete search history.

(56) References Cited

U.S. PATENT DOCUMENTS 6,665,715 B1 * 12/2003 Houri ............................ 709/223
6,684,250 B2 * 1/2004 Anderson et al. ............. 709/225

(Continued)

FOREIGN PATENT DOCUMENTS

WO   WO0239699   5/2002

OTHER PUBLICATIONS

Orkut Buyukkokten et ai, "Exploiting Geographical Location Information of Web Pages", Jun. 1999, published in Proceedings of Workshop on Web Databases (WebDB'99) held in conjunction with ACM SIGMOD'99.*

(Continued)

*Primary Examiner* — Brian P Whipple
*Assistant Examiner* — Michael A Chambers
(74) *Attorney, Agent, or Firm* — Nicholas Chen; David Andrews; Micky Minhas

(57) ABSTRACT

A network address mapping system is described. The network address mapping system can identify a set of Web pages, collects information from the Web pages indicating geographical locations ("geolocations"), and correlate the geolocations with the network addresses from which the identified Web pages are served. The collected information can be weighted based on various factors, such as its relative position in a Web page. The collected information can then be used to identify a geolocation. The network mapping system can deduce geolocations for portions of ranges of network addresses based on the score, and can infer geolocations for other portions based on the deduced geolocations. This mapping can then be stored in a database and provided as a geomapping service. The network address mapping system is able to map network addresses to geographical locations. Thereafter, when a user's client computing device accesses a Web server, the Web server can easily and accurately determine a geographical location by querying the database storing the mapping or a geomapping service.

18 Claims, 5 Drawing Sheets

(56) References Cited

U.S. PATENT DOCUMENTS

| | | | |
|---|---|---|---|
| 6,757,740 B1* | 6/2004 | Parekh et al. | 709/245 |
| 6,859,826 B2* | 2/2005 | Bahlmann | 709/220 |
| 7,065,042 B1* | 6/2006 | Pan et al. | 370/229 |
| 7,100,204 B1* | 8/2006 | Myllymaki et al. | 726/22 |
| 7,542,461 B2 | 6/2009 | Oran | |
| 8,364,816 B2* | 1/2013 | Guo et al. | 709/225 |
| 2001/0027487 A1* | 10/2001 | Ruping et al. | 709/229 |
| 2002/0016831 A1 | 2/2002 | Peled et al. | |
| 2003/0036949 A1* | 2/2003 | Kaddeche et al. | 705/14 |
| 2003/0134631 A1 | 7/2003 | Snyder et al. | |
| 2005/0071417 A1* | 3/2005 | Taylor et al. | 709/200 |
| 2005/0108244 A1* | 5/2005 | Riise et al. | 707/10 |
| 2006/0160535 A1 | 7/2006 | Snyder et al. | |
| 2006/0268902 A1* | 11/2006 | Bonner | 370/401 |
| 2007/0008110 A1 | 1/2007 | Li et al. | |
| 2007/0198674 A1 | 8/2007 | Li et al. | |

OTHER PUBLICATIONS

"MaxMind—GeoIP city Accuracy for Selected Countries," http://ww.netgeo.com/ip.location.htm, downloaded Sep. 25, 2007 (3 pages).

Turner, "Geolocation by IP Address/Linux Journal," http://www.linuxjournal.com/article/7856, downloaded Sep. 25, 2007 (11 pages).

"NatGeo: IP Location Mapping Geolocation," http://www.netgeo.com.ip.location.htm.

Gueye et al. "Constraint-based Geolocation of Internet Hosts," *ICM '04*, Oct. 25-27, Taormina, Sicily, Italy. Copyright 2004 ACM.

Katz-Bassett et al., "Towards IP Geolocation Using Delay and Topology Measurements", *Proceedings of IMC '06*, 2006.

Moore et al., "Where in the World is netgeo.caida.org?", *Proceedings of INET'00*, 2000. Available at http://www.caida.org/publications/papers/2000/inet_netgeo/inet_netgeo.html.

Padmanabhan et al., "An Investigation of Geographic Mapping Techniques for Internet Hosts", *Proceedings of SIGCOMM '01*, 2001.

Wong et al., "Octant: A Comprehensive Framework for the Geolocation of Internet Hosts", *Proceedings of NSDI 2007*, Cambridge, MA, Apr. 2007.

Ziviani et al., "Improving the accuracy of measurement-based geographic location of Internet hosts", *Computer Networks, Elsevier Science*, 47(4):503-523, Mar. 2005.

Chen et al., "Mining the Web for IP Address Geolocations", Oct. 25, 2007, 7 pgs.

International Search Report for Application No. PCT/US08/79677; Applicant: Microsoft Corporation; Date of mailing: May 1, 2009 (3 pages).

Buyukkokten, Orkut et al., "Exploiting Geographical Location Information of Web Pages," Jun. 1999, published in Proceedings of Workshop on Web Databases (WebDB'99) held in conjunction with ACM SIGMOD'99.

* cited by examiner

MAPPING NETWORK ADDRESSES TO GEOGRAPHICAL LOCATIONS

CROSS REFERENCE TO RELATED APPLICATION

This application is a continuation application of U.S. patent application Ser. No. 11/871,810, filed on Oct. 12, 2007, and entitled "MAPPING NETWORK ADDRESSES TO GEOGRAPHICAL LOCATIONS," issued Jan. 29, 2013, as U.S. Pat. No. 8,364,816, which is incorporated herein in its entirety by reference.

BACKGROUND

The Internet is used for a variety of reasons, including electronic commerce, exchanging information such as electronic mail, retrieving information doing research, and the like. Many standards have been established for exchanging information over the Internet, including the World Wide Web (WWW). The WWW allows a server computer system (i.e., web server or Web site) to send documents (e.g., Web pages) to a remote client computer system. The remote client computer system can then display the Web pages. Each resource (e.g., computer or Web page) of the W is uniquely identifiable by a Uniform Resource Locator (URL). To view a specific Web page, a client computer system specifies the URL for that web page in a request (e.g., a HyperText Transfer Protocol (HTTP) request). The request is forwarded to the Web server that can provide the requested Web page. When that Web server receives the request, it sends the requested Web page to the client computer system. When the client computer system receives that Web page, it typically displays the Web page using a browser. A browser is typically an application program for requesting and displaying Web pages.

A network address is a location to which network messages ("messages") are sent or from which messages are received. HTTP requests and responses are normally directed to specific network addresses using a transport control protocol/Internet protocol (TCP/IP). These messages can identify a computing device as an intended recipient of the message by specifying an IP address. IP addresses are conventionally specified using a sequence of numbers. For example, in version 4 of IP (IPv4), network addresses are specified using 32 bits. An IPv4 address can be 192.168.128.64, which has four 8-bit bytes. Other protocols may use different network addressing schemes.

Network addresses are sometimes specified in ranges ("segments" or "subnets"). For example, an IPv4 range can be specified as 192.168.128.0/24. In this notation, the value after the slash indicates the number of bits that are used to specify the range. Because 8 bits are not specified (32 bits total for the network address less 24 bits for the range), the actual range is 192.168.128.0 to 192.168.128.255. If the range is specified as 192.168.0.0/16, the actual range is 192.168.0.0 to 192.168.255.255.

To ensure uniqueness of IP addresses across the Internet, a central authority distributes IP addresses. Only one device on the Internet can have a particular IP address. If this were not so, a network message may be routed incorrectly to a network device that is not the intended recipient of the message. IP addresses are generally allocated in ranges. As examples, a city or township may be provided a range of network addresses, or a large company may be provided a range of network addresses. For example, a city may be provided the range 192.168.0.0/16. These entities may then subdivide these ranges. For example, the city may allocate 192.168.1.0/24 to a company located in that city and 192.168.2.0/24 to another company located in that city. On the other hand, a large company may distribute its network addresses across geographical boundaries. For example, a large Internet service provider may be allocated 193.0.0.0/8. This Internet service provider may subdivide its network into smaller ranges for each geographical region in which it provides Internet access services. Thus, it may allocate 193.1.1.0/24 for a town and 193.2.0.0/16 for a large city.

If the network address of a user's computing device (e.g., client computing device) is known, various interesting applications become possible. For example, search results, advertising, weather reporting, and other applications can be highly tailored to the user's location.

SUMMARY

A network address mapping system is described. The network address mapping system can identify a set of Web pages, collect information from the Web pages indicating geographical locations ("geolocations"), and correlate the geolocations with the network addresses corresponding to a Web server that serves the identified Web pages. The collected information can be weighted based on various factors, such as the relative position of the information in the Web page. The collected information can then be used to identify a geolocation. The network mapping system can deduce geolocations for portions of ranges of network addresses based on the score, and can infer geolocations for other portions based on the deduced geolocations. The network address mapping system can also employ further location inferring and error correction logic that applies the identified majority location to broader ranges of network addresses. The network address mapping system may employ the majority voting mechanism to map correlated information to network ranges and then apply majority voting to broaden the range iteratively. This mapping can then be stored in a database and provided as a geomapping service. The network address mapping system is able to map network addresses to geographical locations. Thereafter, when a user's client computing device accesses a Web server, the Web server can easily and accurately determine a geographical location by querying the database storing the mapping or a geomapping service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
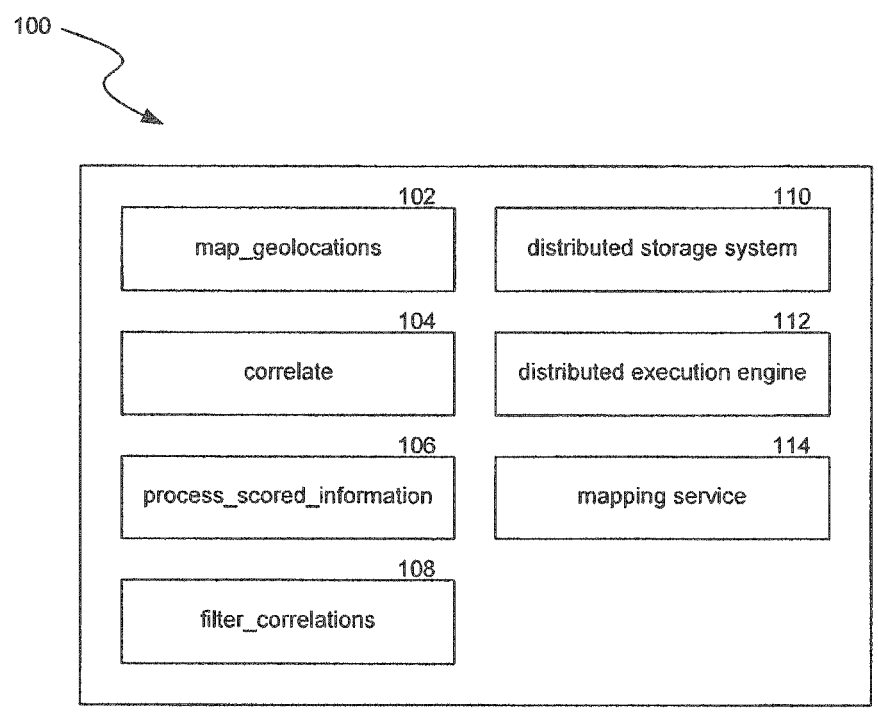
FIG. 1 is a block diagram illustrating components of the network address mapping system in various embodiments.

A network address mapping system is described. In various embodiments, the network address mapping system identifies a set of Web pages, collects information from the Web pages indicating geographical locations ("geolocations"), and correlates the geolocations with the network addresses corresponding to a Web server that serves the identified Web pages. The information can be collected based on known formats or tokens identifying the information. For examples, phone numbers and postal codes can be in recognizable formats. Addresses, facsimile numbers, and telephone numbers may be preceded by tokens or abbreviations, such as Address:, Addr:, Tel., Fax., etc. The information can also be collected based on other templates. The collected information can be weighted based on various factors, such as the relative position of the information in the Web page. For example, if it is determined that contact information containing addresses or phone numbers generally are placed at the bottom of Web pages, information collected from the bottom of Web pages may be provided a greater weight than information collected from the top of Web pages. The collected information can then be used to identify a geolocation. For example, a Web page from Microsoft Corporation of Redmond, Wash., USA may advertise a Professional Developer's Conference at microsoft.com/events/pdc.htm. A city may be identified near the top of that Web page indicating where the conference will occur (e.g., Las Vegas, Nev.). A telephone number and facsimile number near the bottom of the Web page may provide a telephone area code that is associated with Redmond, Wash., USA. Because the bottom portion of the Web page may have a greater weight than its top portion, the network address mapping system may correlate the Web page with Redmond, Wash., USA, because that location is considered to have a higher probability of being correct than Las Vegas, Nev.

Web servers are associated with a network address. The Web server corresponding to the URL provided above is microsoft.com. This Web server may have the following network address: 207.46.197.32. The network address mapping system may initially correlate this network address with Redmond, Wash., USA based on the analysis of the Web page at microsoft.com/events/pdc.htm. Using this technique, the network address mapping system may then correlate the following additional addresses with Redmond, Wash., USA: 207.46.197.2; 207.46.148.145; and 207.46.156.200 by analyzing other URLs and identifying their servers. Because the least significant (i.e., rightmost) 15 bits of these network addresses are commonly correlated with Redmond, Wash., USA, the network address mapping system may deduce that the following range is to be mapped to Redmond, Wash., USA: 207.46.128.0/17. In so doing, all network addresses from 207.46.128.0 to 207.46.255.255 may be associated with Redmond, Wash., USA. To make this deduction, the network address mapping system may perform an iterative computation by processing and clustering network addresses identified during the information correlation described above. For example, the network address mapping system may first determine if all addresses in 207.46.128.0/24 are correlated to be in Redmond, followed by all addresses in 207.46.128.0/23, followed by all addresses in 207.46.128.0/22, and so forth. In various embodiments, the network address mapping system may employ a majority voting mechanism so that if a majority of the correlated geographical locations are in one geolocation and a minority are in one or other geolocations, the range of network addresses is mapped to the geolocation identified by the majority. The network address mapping system can also employ further location inferring and error correction logic that applies the majority location to broader ranges of network addresses. For example, if a majority of network addresses in the range 207.46.128.0/22 are in Redmond, Wash., USA, but the locations of a minority of the network addresses or sub-ranges are unknown, the network address mapping system may map all addresses in the range to Redmond. In various embodiments, the network address mapping system may employ the majority voting mechanism to map correlated information to network ranges and then apply majority voting to broaden the range iteratively.

By applying these routines iteratively, the network address mapping system is able to map network addresses to geographical locations. This mapping can then be stored in a database and provided as a geomapping service. Thereafter, when a user's client computing device accesses a Web server, the Web server can easily and accurately determine a geographical location by querying the database storing the mapping or a geomapping service.

Several embodiments of the network address mapping system will now be described in more detail with reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the inter-network remote control system. In addition, the data structures and message structures may be stored or transmitted via a data transmission medium, such as a signal on a communications link. Various communications links may be used, such as the Internet, a local area network, a wide area network, a wireless network, or a point-to-point dial-up connection.

In various embodiments, the hardware devices described herein can be implemented as software components and vice versa. In various embodiments, functionality described as being performed by a particular device or component can instead (or additionally) be performed by a different device or component.

FIG. 1 is a block diagram illustrating components of the network address mapping system in various embodiments. The network address mapping system 100 can include a map_geolocations component 102, a correlate component 104, a process_scored_information component 106, a filter correlations component 108, a distributed storage system 110, a distributed execution engine component 112, and a mapping service component 114. The map_geolocations component 102 can map network addresses to geographical locations that may be identified in Web pages stored at the network addresses. The correlate component 104 can correlate the stored Web information with geolocations or network addresses. The process_scored_information component 106 can process correlated and scored information to determine clusters of network addresses corresponding to identified geographical locations. The filter_correlations component 108 can identify groups of network addresses corresponding to the identified geographical locations. The distributed storage system 110 can store indications of Web pages. The distributed storage system may also store copies of the Web pages. As an example, a network crawler can identify and retrieve Web pages that are then stored in the distributed storage system for further analysis. The distributed execution engine 112 can enable the various components associated with the network address mapping system to operate on one or more computing devices. The distributed execution engine may include a job scheduler, resource allocation component, input/output processing component, and failure recovery component. The mapping service component can receive a network address and provide a geolocation to which the network address is mapped. The mapping service can be an Internet service or other type of service (e.g., an application program interface). The network address mapping system can employ these components of the distributed execution engine to control and monitor the distributed execution. The network address mapping system can also include other components that are not illustrated.

Figure 2:
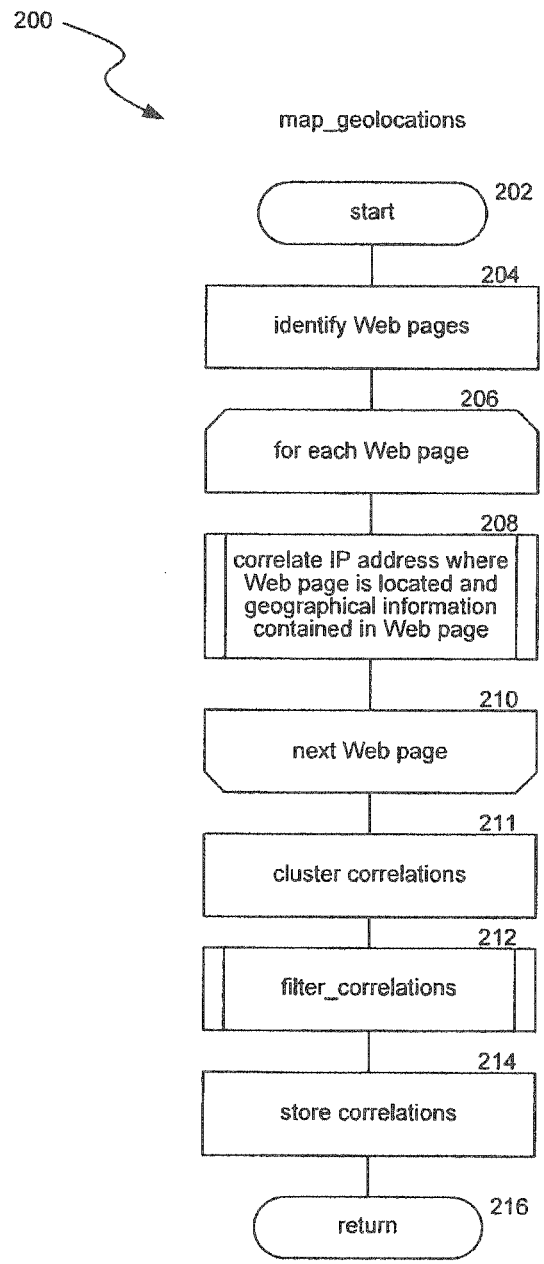
FIG. 2 is a flow diagram illustrating a map_geolocations routine invoked by the network address mapping system in some embodiments.

FIG. 2 is a flow diagram illustrating a map_geolocations routine invoked by the network address mapping system in some embodiments. The network address mapping system can invoke the map_geolocations routine 200 to map geographical locations to network addresses. The routine begins at block 202. At block 204, the routine identifies Web pages. As an example, the routine may identify Web pages for processing that are stored in its distributed storage system. The distributed storage system may store identifiers (e.g., links or URLs) for Web pages or may store a copy of the Web pages. The routine repeats the logic contained in block 208 for each of the identified Web pages. At block 206, the routine selects a Web page from the identified Web pages for processing. At block 208, the routine invokes a correlate subroutine to correlate the network address associated with the Web server that hosts the Web page with geographical information. The correlate routine is described in further detail below in relation to FIG. 3. At block 210, the routine selects another Web page from the identified set of Web pages. If there are no Web pages that remain to be processed, the routine continues at block 211. Otherwise, the routine continues at block 208.

At block 211, the routine calculates a probability distribution function for a segment of the network of which the Web server is a part. In some embodiments, the segment is formed with the entire network address except the least order byte (e.g., 207.46.197.0/24). The probability distribution function can be calculated by totaling all weights for all Web servers in a segment and dividing the sum of the scores for a particular location across the network segments by the total weights. Calculation of weights is described in further detail below in relation to FIG. 4.

At block 212, the routine invokes a filter_correlations subroutine to further process the correlations identified at block 208. The filter_correlations routine is described in further detail below in relation to FIG. 5. At block 214, the routine stores the correlations, such as in a database. Once the correlations are stored, the geographical locations of particular network locations can be easily identified, such as by the mapping service. The routine returns at block 216.

Those skilled in the art will appreciate that the logic illustrated in FIG. 2 and described above, and in each of the flow diagrams discussed below, may be altered in various ways. For example, the order of the logic may be rearranged, substeps may be performed in parallel, illustrated logic may be omitted, other logic may be included, etc.

Figure 3:
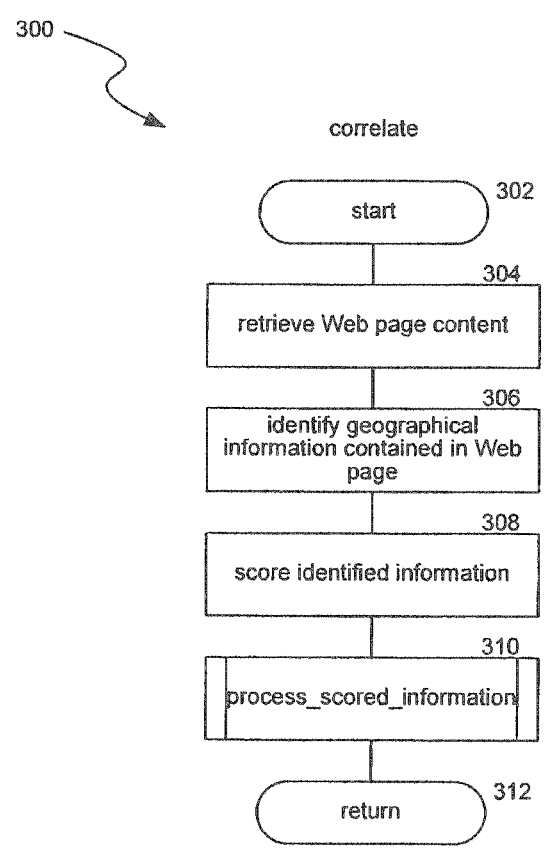
FIG. 3 is a flow diagram illustrating a correlate routine invoked by the network address mapping system in some embodiments.

FIG. 3 is a flow diagram illustrating a correlate routine invoked by the network address mapping system in some embodiments. The network address mapping system can invoke the correlate routine when mapping network addresses to geographical locations. The correlate routine 300 begins at block 302. At block 304, the routine retrieves Web page content, such as Web page content stored at an identified network location (e.g., a URL). At block 306, the routine identifies geographical information contained in the Web page. As examples, the routine may identify information contained in the Web page after identifiers or tokens, such as Addr:, Tel:, Fax number, telephone number, zip code, and so forth. In various embodiments, other techniques can be used to identify geolocations in content, such as templates, natural language recognition, etc. At block 308, the routine scores the identified information. As examples, the score of geolocation information may be related to an indication of a confidence in the relevance of the information, where the information is stored in the Web page, and so forth. When the location of the information in the Web page is used to score the information, the score may be based on whether the information is near the top of the Web page, middle of the Web page, bottom of the Web page, and so forth. As an example, information contained at the bottom of the Web page may be provided a higher score than information contained at the top of the Web page if it is determined that contact information or other geographical information is generally located at the bottom of most Web pages. In some embodiments, the network address mapping system may filter out and not process some Web pages. As an example, it may not process Web pages containing more than a specified number of geolocation items, assuming that such Web pages may be directories (e.g., YELLOWPAGES). In some embodiments, the network address mapping system may filter out Web pages based on the purpose of the content when the content does not appear to contain legitimate geolocation information. At block 310, the routine invokes a process_scored_information subroutine to further process the identified information. The process_scored_information subroutine is described in further detail below in relation to FIG. 4. At block 312, the routine returns.

Figure 4:
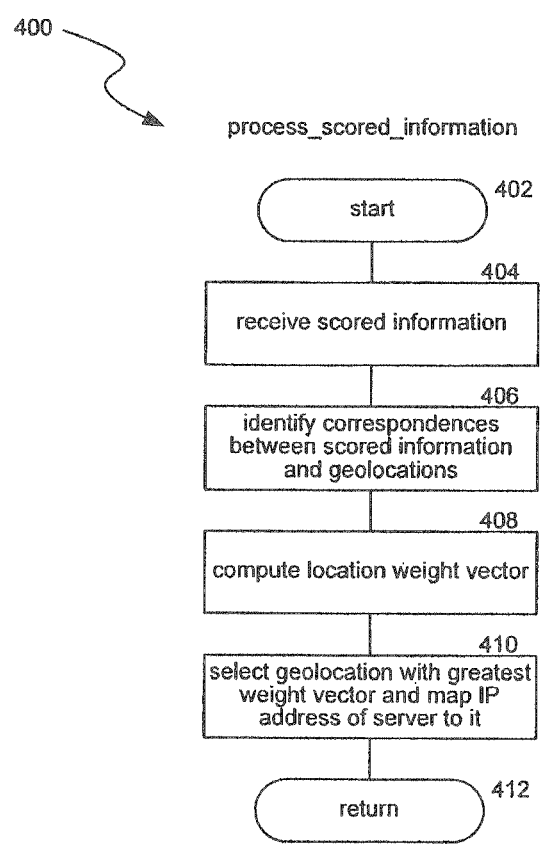
FIG. 4 is a flow diagram illustrating a process_scored_information routine invoked by the network address mapping system in some embodiments.

FIG. 4 is a flow diagram illustrating a process_scored_information routine invoked by the network address mapping system in some embodiments. In some embodiments, the routine is invoked for a server after all URLs are processed for that server. The network address mapping system invokes the process_scored_information routine 400 to further process information that has been retrieved and scored. The routine begins at block 402. At block 404, the routine receives the scored information. The information may have been scored by the correlate routine described above in relation to FIG. 3.

At block 406, the routine identifies correspondences between the scored information and geolocations. As examples, the routine may identify geographical regions corresponding to area codes of phone numbers or facsimile numbers in the Web page.

At block 408, the routine computes a location weight vector for the Web server storing the Web page. In some embodiments, the routine may generate a table (or other data structure) that stores the location weight vector. For example, suppose a Web server contains three URLs that the network address mapping system has processed. Each URL may be initially associated with different geolocations, each with a different score, based on the contents of the URL. The location weight vector for each geolocation is the mean value of the scores for that geolocation. Thus, if UR1 was identified as corresponding to Las Vegas, Nev., with a weight of 0.4 and Redmond, Wash. with a weight of 0.8; URL2 was identified as corresponding to Las Vegas, Nev., with a weight of 0.3 and Redmond, Wash. with a weight of 0.7; and URL3 was identified as corresponding to Phoenix, Ariz., with a weight of 0.5 and Redmond, Wash., with a weight of 0.6; then the location weight vector would be as follows:

Las Vegas, Nev. (0.4+0.3+0.0)/3=0.2

Redmond, Wash. (0.8+0.7+0.6)/3=0.7

Phoenix, Ariz. (0.0+0.0+0.5)/3=0.2

The location weight vector for the Web server is thus {Las Vegas, Nev.: 0.2; Redmond, Wash.: 0.7; Phoenix, Ariz.: 0.2}.

At block 410, the routine may select the geolocation with the greatest location weight vector and map the IP address of the Web server storing the processed URLs to that geolocation. In this example, the routine may select Redmond. At block 412, the routine returns.

Returning briefly to block 211, the location weight vector may include the Web server now mapped to Redmond as well as other Web servers in the same subnet that each contains different URLs. The contribution of this Web server to the location weight vector is 0.2 for Las Vegas, 0.7 for Redmond, and 0.2 for Phoenix. Other servers in the same subnet may have different contributions to location weight vectors. As an example, suppose this server is Server1 and Server2 contributes 0.3 for Las Vegas, 0.5 for Redmond, and 0.4 for Beijing, China. The total sums of all weights is 0.2+0.7+0.2+0.3+0.5+0.4=2.3. The probability distribution function would be as follows:

Las Vegas, Nev. (0.2+0.3)/2.3=21.%

Redmond, Wash. (0.7+0.5)/2.3=52.2%

Phoenix, Ariz. (0.2+0.0)/2.3=9.7%

Beijing, China (0.0+0.4)/2.3=17.4%

Based on this probability distribution, the network address mapping system may map the network segment to Redmond, Wash., because Redmond has the highest probability.

Figure 5:
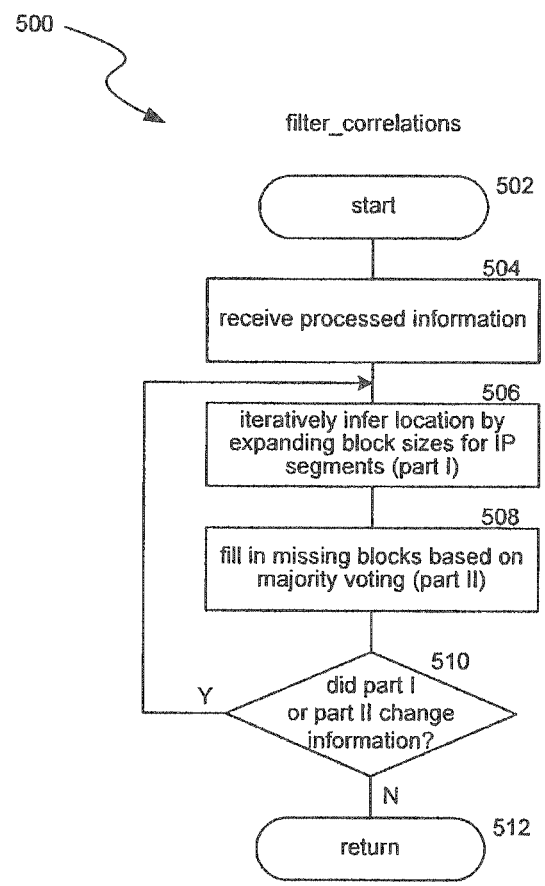
FIG. 5 is a flow diagram illustrating a filter_correlations routine invoked by the network address mapping system in some embodiments.

FIG. 5 is a flow diagram illustrating a filter_correlations routine invoked by the network address mapping system in some embodiments. The network address mapping system can invoke the filter_correlations routine 500 to identify a broad range of network addresses that are to be associated with a particular geographical location. The routine begins at block 502. At block 504, the routine receives information processed previously, such as by the routines described above in relation to FIGS. 3 and 4.

At block 506, the routine iteratively infers geographical location information by expanding block sizes for network address ranges. As examples, the routine may expand block sizes by full segments or portions of segments. The routine may start at 207.46.128.0/24, then check 207.46.128.0/23, followed by 207.46.128.0/22, and so forth. When the network address mapping system has sufficient information to infer geolocations, the routine may add the inferred geolocation information to the blocks with which no geographical information has already been correlated. For example, in the case of 207.46.128.0/20, if network addresses in a majority of the range distributed between the first and second half of the range have been mapped to Redmond, the routine may infer that the entire range 207.46.128.0/20 should be mapped to Redmond. Alternatively, if only network addresses in the second half of the range have been mapped to Redmond, the routine may be unable to infer the mapping for the first half of the range because half ranges (or one entire bit in a network address) are generally how network address ranges are allocated to companies or geolocations.

At block 508, the routine may further correlate geographical information with larger block sizes. For example, if a majority of a network address range has been mapped to Redmond but some small portions of the range have either been mapped to a different geolocation or have not been mapped, the routine may change those mappings to Redmond as well.

If at decision block 510, the routine determines that no geographical information was added by the logic of either block 506 or block 508, the routine returns at block 512. Otherwise, the routine continues at block 506 to iterate the clustering process.

By mapping ranges of network addresses to geolocations and storing these mappings, the network address mapping system can provide services that other Web services can employ to provide accurate and meaningful information to users.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, various networks and network address types can be used. Accordingly, the invention is not limited except as by the appended claims.

We claim:

1. A method performed by a computing device for mapping network addresses to geographic locations, comprising:
for each of a plurality of network addresses in the same range of network addresses:
retrieving from a server responding to the network address contents of a web page;
identifying geographical information contained in the contents;
scoring the identified geographical information;
processing the scored geographical information to identify a geographical location;
mapping the network address to the identified geographical location;
for a selected one of the network addresses, in response to the score established for the geographical information identified in the contents of the server responding to the selected network address:
determining a geographical location identified for a majority of the plurality of network addresses; and
remapping the selected network address to the determined geographical location.

2. The method of claim 1 wherein, for a distinguished network address, the retrieving, identifying, scoring, and processing is performed for each of a plurality of web pages retrievable from the server responding to the distinguished network address,
the method further comprising, for each geographical location identified for any of the plurality of webpages retrievable from the server responding to the distinguished network address, aggregating the scores of the geographical information for which the geographical location was identified to obtain an aggregated score for the geographical location;
and wherein the distinguished network addresses mapped to the geographical location having the highest aggregated score.

3. The method of claim 1 wherein the contents comprise a telephone number displayed to users who navigate to the web page.

4. The method of claim 1 wherein the contents comprise a common abbreviation for a geographical address.

5. The method of claim 1 wherein the score for content varies based on a position in the web page at which the content occurs.

6. The method of claim 5 wherein the score is higher when the position is near a bottom of the web page.

7. A computer-readable storage device storing contents adapted to cause a computing device to perform a method for mapping network addresses to geographical locations, the method comprising:

for each of a plurality of network addresses in the same range of network addresses:
retrieving from a server responding to the network address contents of a web page;
identifying geographical information contained in the contents;
scoring the identified geographical information;
processing the scored geographical information to identify a geographical location;
mapping the network address to the identified geographical location;

for a selected one of the network addresses, in response to the score established for the geographical information identified in the contents of the server responding to the selected network address:
determining a geographical location identified for a majority of the plurality of network addresses; and
remapping the selected network address to the determined geographical location.

8. The computer-readable storage device of claim 7 wherein, for a distinguished network address, the retrieving, identifying, scoring, and processing is performed for each of a plurality of web pages retrievable from the server responding to the distinguished network address, the method further comprising, for each geographical location identified for any of the plurality of webpages retrievable from the server responding to the distinguished network address, aggregating the scores of the geographical information for which the geographical location was identified to obtain an aggregated score for the geographical location;
and wherein the distinguished network addresses mapped to the geographical location having the highest aggregated score.

9. The computer-readable storage device of claim 7 wherein the contents comprise a telephone number displayed to users who navigate to the web page.

10. The computer-readable storage device of claim 7 wherein the contents comprise a common abbreviation for a geographical address.

11. The computer-readable storage device of claim 7 wherein the score for content varies based on a position in the web page at which the content occurs.

12. The computer-readable storage device of claim 11 wherein the score is higher when the position is near a bottom of the web page.

13. A system for mapping network addresses to geographical locations, comprising:
a retrieval component that, for each of a plurality of uniform resource locations, retrieves a web page identified by the uniform resource location from a network address;
an execution engine that maps network addresses to geographical locations based on geographical information contained in the web page or webpages retrieved from each of those network addresses;
a correlation component that correlates the geographical information with a geographical location and iteratively clusters the correlations in increasingly larger ranges of network addresses; and
a filter component that filters correlated geographical information by inferring geographical locations for network address ranges for which geographical information could not be mapped by (1) filling in missing geographical location with an identified geographical location when a majority of the network addresses in the range are mapped to the identified geographical location and (2) correcting a geographical location to be the same as the identified geographical location.

14. The system of claim 13 further comprising a scoring component that scores the geographical information.

15. The system of claim 13 further comprising a second filter component that filters correlated geographical information by replacing a first geographical location for a network address range with a second geographical location for the network address range when a majority of smaller portions of the network address range indicate the second geographical location.

16. The system of claim 13 further comprising a second filter component that filters correlated geographical information by mapping a portion of a network address range to a geographical location when a majority of other portions of the network address range indicate the geographical location.

17. The system of claim 13 wherein the execution engine is a distributed execution engine wherein a correlation component executes in each of multiple computing devices associated with the execution engine.

18. The system of claim 13 further comprising a service component that receives a network address and provides a geographical location to which the network address is mapped.

* * * * *